(12) United States Patent
Chen et al.

(10) Patent No.: US 10,294,597 B2
(45) Date of Patent: May 21, 2019

(54) SEWING MACHINE

(71) Applicant: Zeng Hsing Industrial Co., Ltd., Taichung (TW)

(72) Inventors: Chia-Hung Chen, Taichung (TW); Hsin-Hau Lin, Taichung (TW); Yi-Chung Chen, Taichung (TW)

(73) Assignee: ZENG HSING INDUSTRIAL CO., LTD., Taichung (TW)

( * ) Notice: Subject to any disclaimer, the term of this patent is extended or adjusted under 35 U.S.C. 154(b) by 101 days.

(21) Appl. No.: 15/620,630

(22) Filed: Jun. 12, 2017

(65) Prior Publication Data
US 2018/0355532 A1 Dec. 13, 2018

(51) Int. Cl.
*D05B 69/18* (2006.01)
*D05B 29/06* (2006.01)
*D05B 55/14* (2006.01)
*G01P 3/487* (2006.01)

(52) U.S. Cl.
CPC ............. *D05B 69/18* (2013.01); *D05B 29/06* (2013.01); *D05B 55/14* (2013.01); *G01P 3/487* (2013.01)

(58) Field of Classification Search
CPC ........ D04B 19/14; D04B 29/10; D04B 55/14; D04B 69/18; D04B 69/10
See application file for complete search history.

(56) References Cited

U.S. PATENT DOCUMENTS

| | | | | |
|---|---|---|---|---|
| 4,123,981 A | * | 11/1978 | Brown | D05B 19/02 112/321 |
| 4,166,423 A | * | 9/1979 | Brienza | B65H 75/18 112/254 |
| 4,686,917 A | * | 8/1987 | Braun | D05B 29/02 112/311 |
| 2009/0007829 A1 | * | 1/2009 | Shimizu | D05B 19/12 112/470.01 |

* cited by examiner

*Primary Examiner* — Danny Worrell
(74) *Attorney, Agent, or Firm* — DLA Piper LLP (US)

(57) ABSTRACT

A sewing machine includes a driving unit, a throat plate, a pressing unit, a detecting unit and a control unit. The detecting unit includes a housing mounted to a connecting module of the pressing unit, a track ball rotatably disposed on the housing, and adapted for contact with a fabric placed on the throat plate, and a plurality of Hall-effect sensors disposed in the housing such that, when the fabric is moved on the throat plate, the track ball rotates relative to the fabric and the housing, so that a rotational speed of the track ball is detected by the Hall-effect sensors. The control unit is disposed for controlling a moving speed of a needle bar of the driving unit corresponding to the rotational speed of the track ball.

9 Claims, 8 Drawing Sheets

US 10,294,597 B2

SEWING MACHINE

FIELD

The disclosure relates to a sewing machine, and more particularly to a sewing machine that can automatically adjust the needle speed of a needle bar.

BACKGROUND

When a conventional sewing machine is sewing a fabric, a needle bar is driven by a driving unit to move reciprocally through a throat plate at a constant speed. However, such a constant-speed manner is only suitable for a conventional sewing operation which has a fixed sewing path, but not for a specific sewing operation, during which the needle bar is moved at a variable speed.

SUMMARY

Therefore, the object of the disclosure is to provide a sewing machine that can alleviate the drawback of the prior art.

According to the disclosure, the sewing machine includes a machine seat unit, a driving unit, a throat plate, a pressing unit, a detecting unit and a control unit. The machine seat unit includes a bottom seat, and a top seat spaced apart from the bottom seat, and disposed above the bottom seat. The driving unit includes a driving module mounted to the top seat of the machine seat unit, and a needle bar driven by the driving module to move in an upper-lower direction. The throat plate is mounted to the bottom seat of the machine seat unit, and is disposed for engagement with the needle bar. The pressing unit includes a pressing member mounted to the top seat of the machine seat unit, extending toward the bottom seat of the machine seat unit, and movable in the upper-lower direction, and a connecting module mounted to the pressing member, and driven by the pressing member to move relative to the bottom seat of the machine seat unit. The detecting unit includes a housing mounted to the connecting module of the pressing unit, a track ball rotatably disposed on the housing, and adapted for contact with a fabric placed on the throat plate, and a plurality of Hall-effect sensors disposed in the housing such that, when the fabric is moved on the throat plate, the track ball rotates relative to the fabric and the housing, so that a rotational speed of the track ball is detected by the Hall-effect sensors. The control unit is electrically connected to the driving module of the driving unit and the Hall-effect sensors of the detecting unit, and is disposed for controlling a moving speed of the needle bar corresponding to the rotational speed of the track ball.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
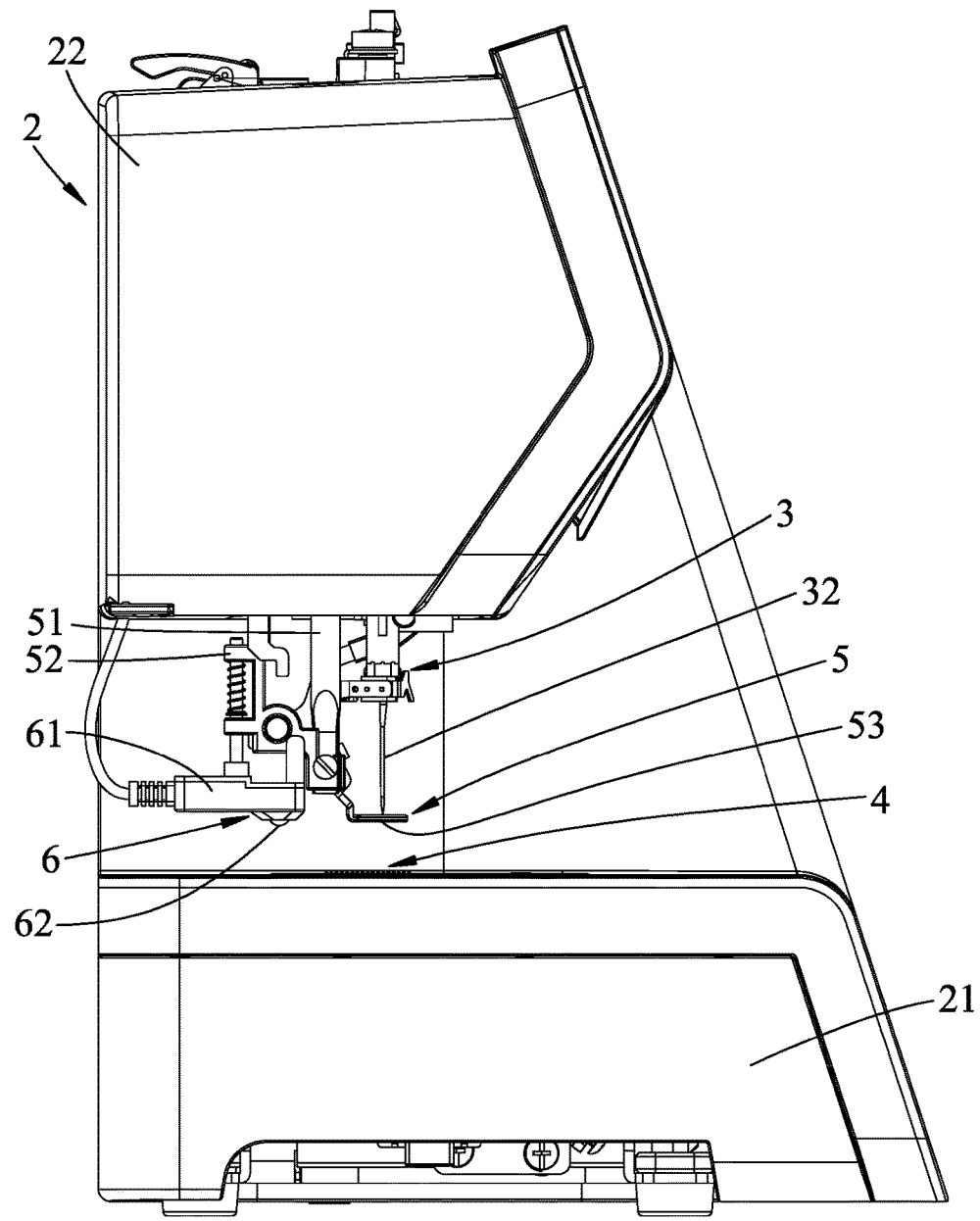
FIG. 1 is a side view of an embodiment of a sewing machine according to the disclosure.
Figure 2:
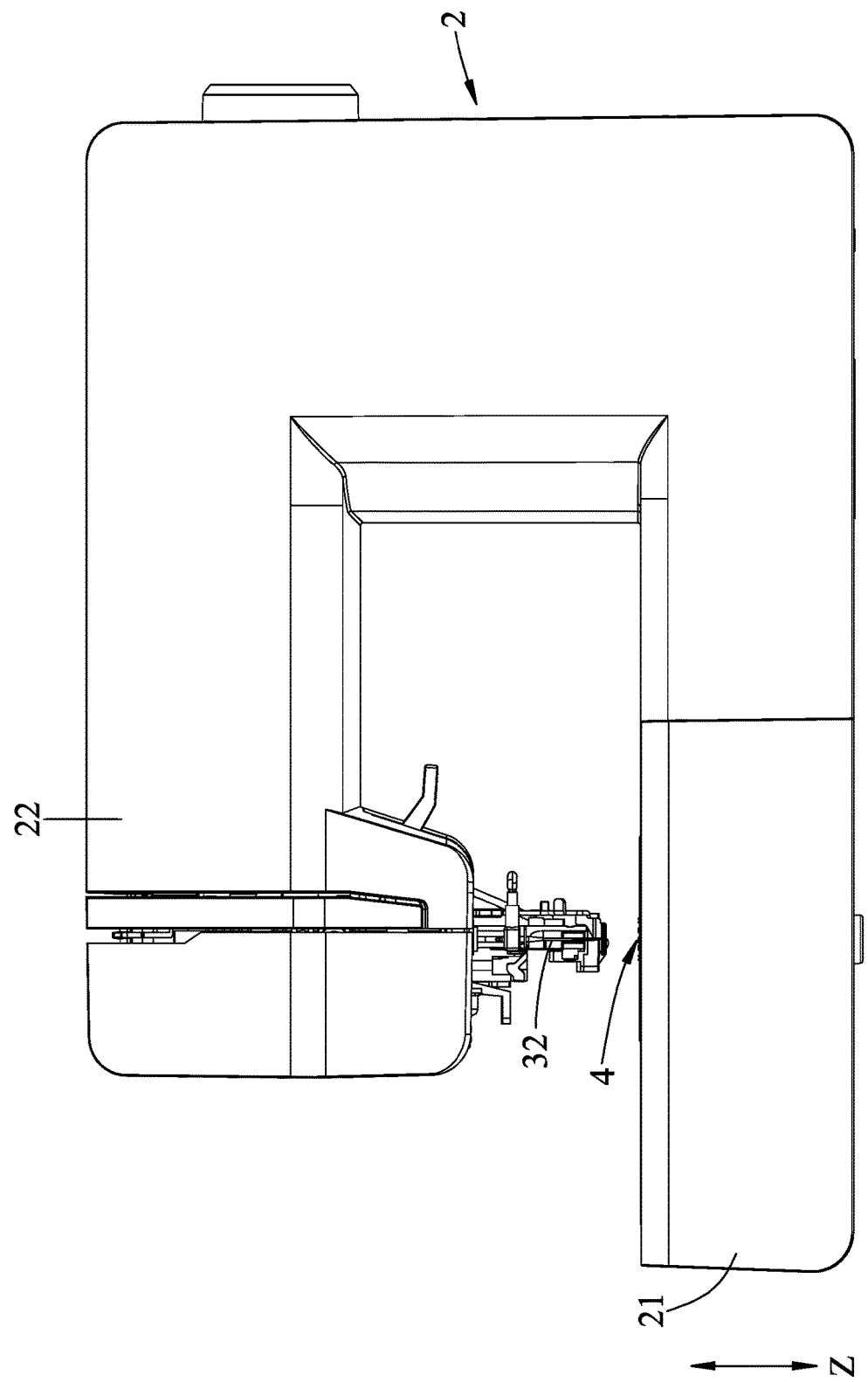
FIG. 2 is a front view of the embodiment.
Figure 3:
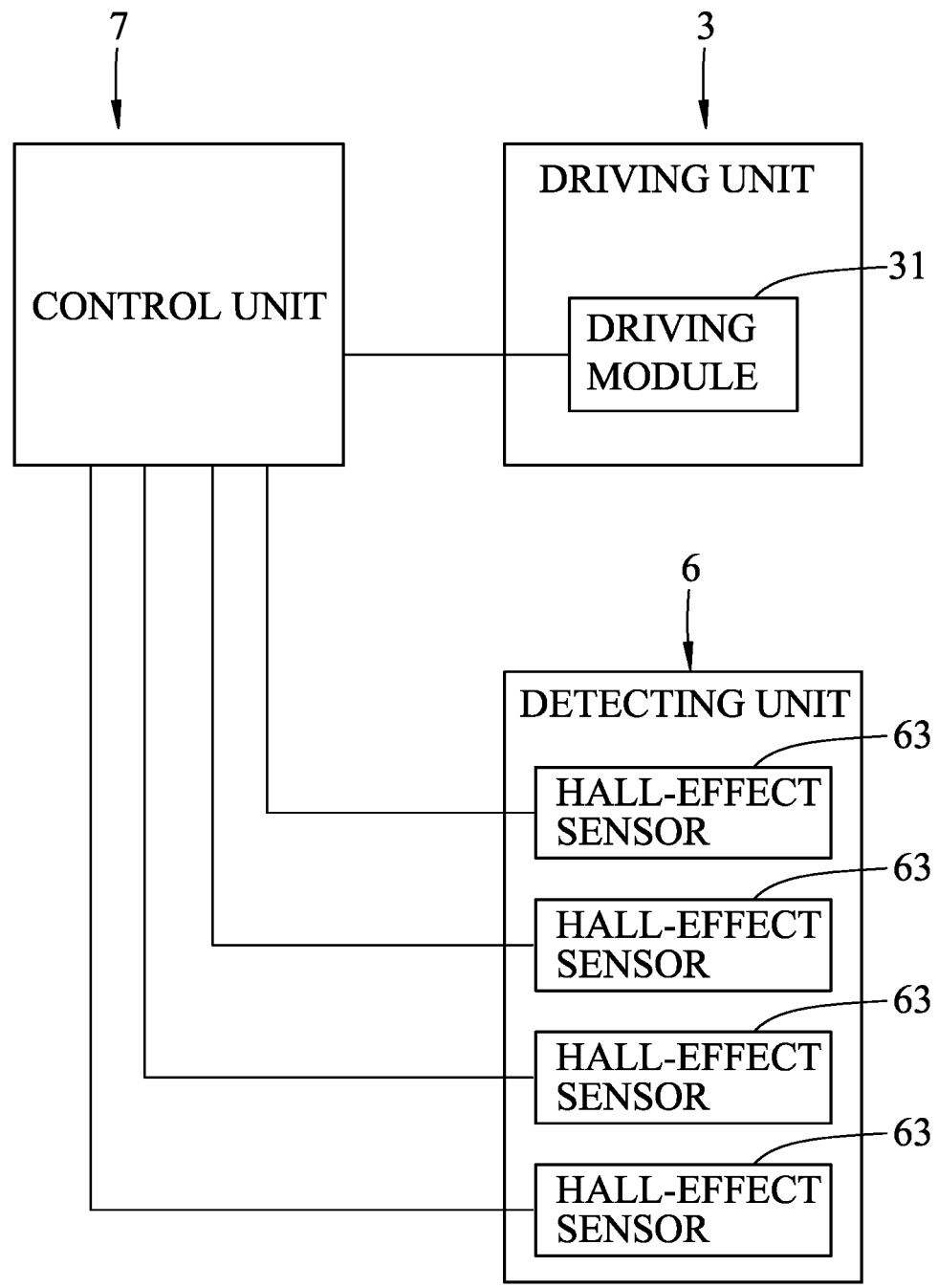
FIG. 3 is a block diagram of the embodiment.

Referring to FIGS. 1 to 3, the embodiment of a sewing machine according to the disclosure includes a machine seat unit 2, a driving unit 3, a throat plate 4, a pressing unit 5, a detecting unit 6 and a control unit 7.

The machine seat unit 2 includes a bottom seat 21, and a top seat 22 spaced apart from the bottom seat 21, and disposed above the bottom seat 21.

The driving unit 3 includes a driving module 31 mounted to the top seat 22 of the machine seat unit 2, and a needle bar 32 driven by the driving module 31 to move in an upper-lower direction (Z).

The throat plate 4 is mounted to the bottom seat 21 of the machine seat unit 2, and is disposed for engagement with the needle bar 32.

Figure 4:
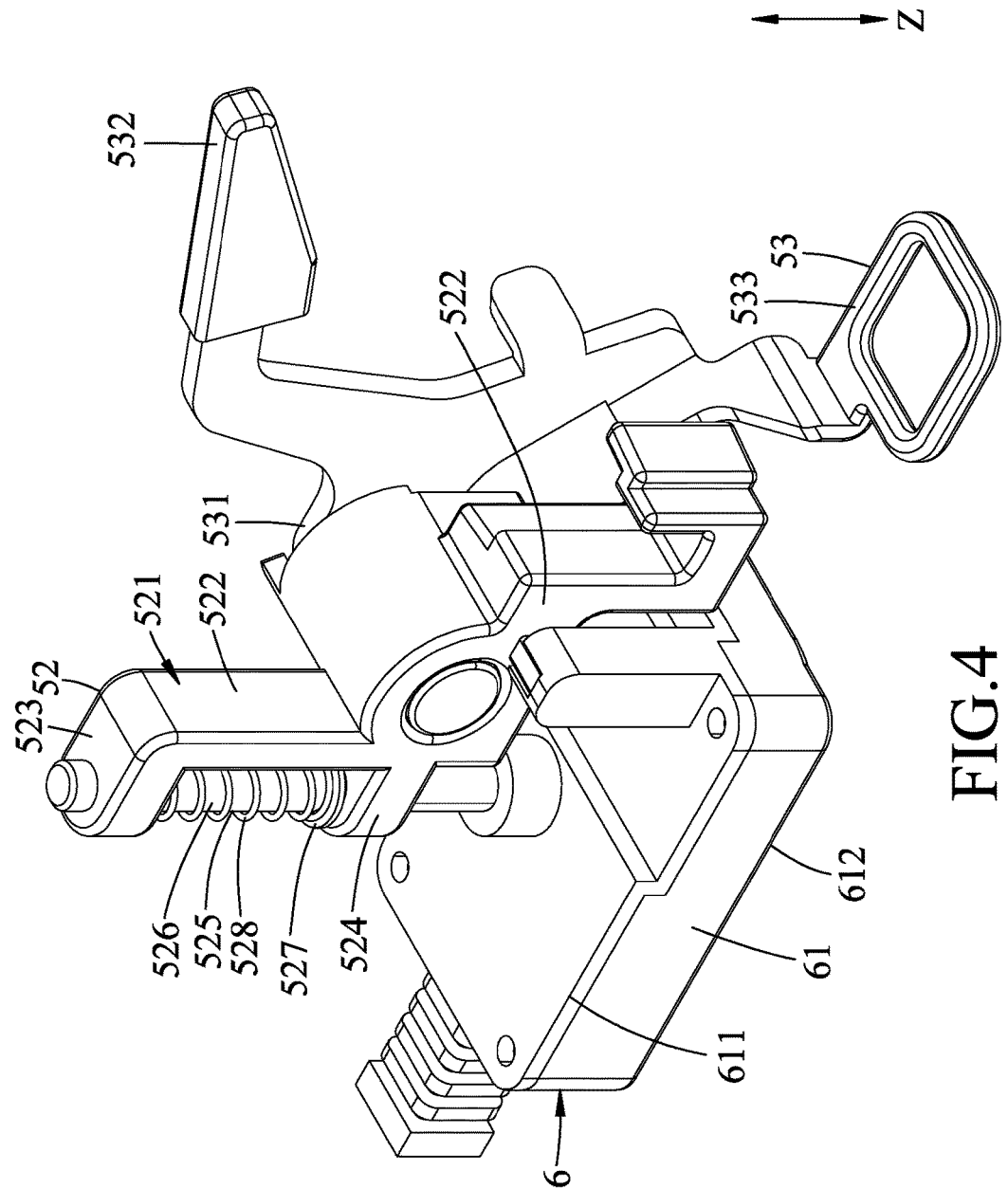
FIG. 4 is a top perspective view of a pressing unit and a detecting unit of the embodiment.

Referring to FIGS. 1, 3 and 4, the pressing unit 5 includes a pressing member 51 mounted to the top seat 22 of the machine seat unit 2, extending toward the bottom seat 21 of the machine seat unit 2, and movable in the upper-lower direction (Z), a connecting module 52 mounted to the pressing member 51, and driven by the pressing member 51 to move relative to the bottom seat 21 of the machine seat unit 2, and a presser foot 53 disposed for engagement with the needle bar 32, and adapted for pressing a fabric (not shown) against the throat plate 4.

The connecting module 52 has a fixed member 521 mounted to the pressing member 51, a rod member 525 movable on the fixed member 521 in the upper-lower direction (Z), and having a bottom portion that is securely connected to the detecting unit 6, and a resilient member 528 disposed between the rod member 525 and the fixed member 521 for providing a resilient force to bias the rod member 525 downwardly.

The fixed member 521 has a fixed portion 522 securely connected to the pressing member 51, an upper plate portion 523 and a lower plate portion 524. The upper and lower plate portions 523, 524 are securely connected to the fixed portion 522, and are spaced apart from each other in the upper-lower direction (Z).

The rod member 525 has a rod portion 526 movably extending through the upper and lower plate portions 523, 524, and an abutting portion 527 securely connected to the rod portion 526, and disposed between the upper and lower plate portions 523, 524.

The resilient member 528 is configured as a coiled compression spring, and has two ends respectively abutting against the upper plate portion 523 of the fixed member 521 and the abutting portion 527 of the rod member 525 such that, the resilient force provided by the resilient member 528 moves the abutting portion 527 of the rod member 525 toward the lower plate portion 524 of the fixed member 521.

The presser foot 53 has a pivot portion 531 pivotally connected to the fixed member 521, an operating portion 532 securely connected to the pivot portion 531 for manual operation, and a pressing portion 533 securely connected to the pivot portion 531. The operating portion 532 is operable to move the pressing portion 533 between a pressing position, where the pressing portion 533 is aligned vertically with the throat plate 4, and a non-pressing position, where the pressing portion 533 is misaligned vertically from the throat plate 4.

Figure 5:
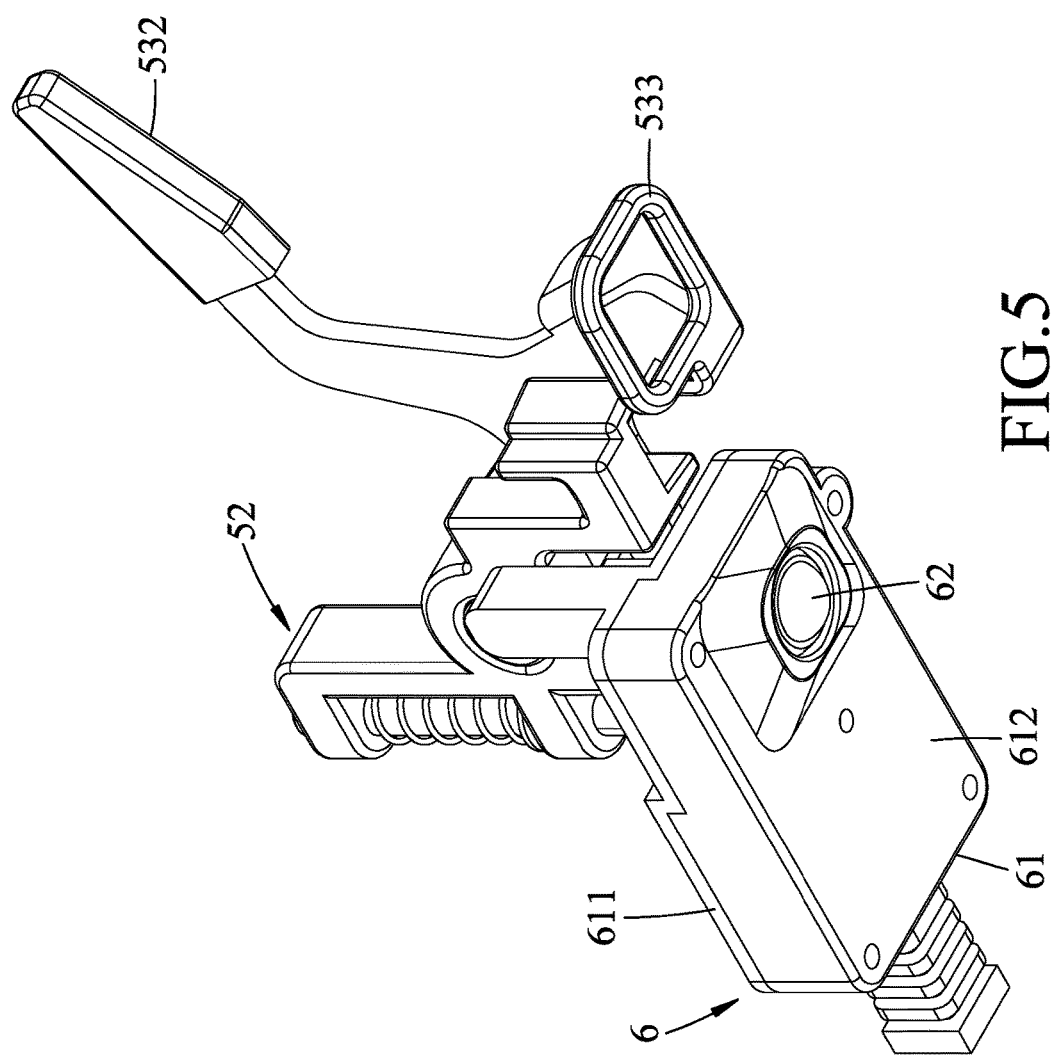
FIG. 5 is a bottom perspective view of the pressing unit and the detecting unit of the embodiment.
Figure 6:
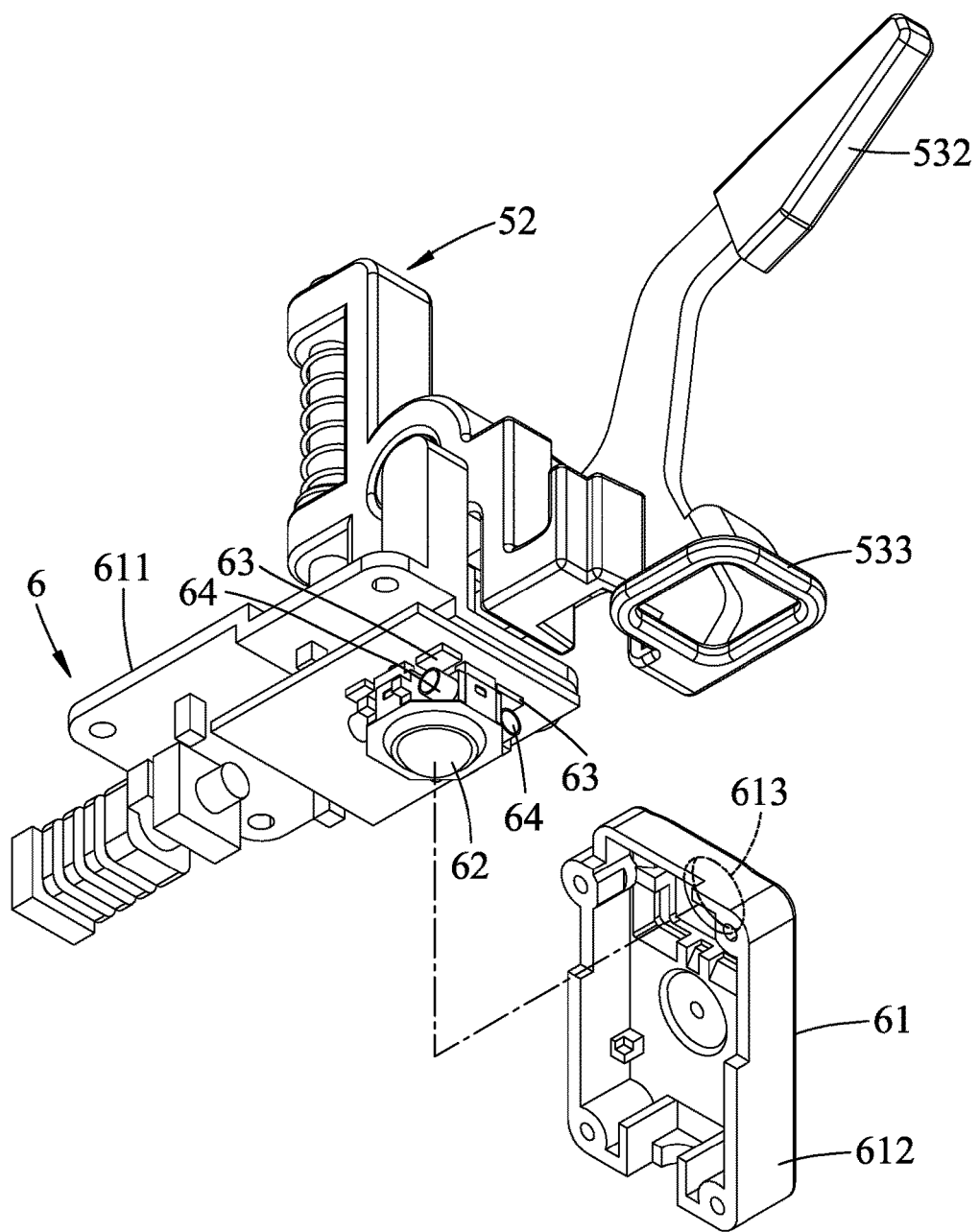
FIG. 6 is a partly exploded view of the pressing unit and the detecting unit of the embodiment.

Referring to FIGS. 4 to 6, the detecting unit 6 includes a housing 61 mounted to the connecting module 52 of the pressing unit 5, a track ball 62 rotatably disposed on the housing 61, and adapted for contact with the fabric, a plurality of Hall-effect sensors 63 disposed in the housing 61, and a plurality of magnetic rollers 64 driven by the track ball 62, and disposed for the Hall-effect sensors 63 to detect a rotational speed of the track ball 63 by magnetic field variations. It should be noted that, in this embodiment, the number of the Hall-effect sensors 63 and the number of the magnetic rollers 64 are four, and may be varied in other embodiments, and in this embodiment, the track ball 62 is rotatably disposed in the housing 61, and may be varied in other embodiments.

The resilient force of the resilient member 528 maintains contact between the track ball 62 and the fabric.

The housing 61 has an upper wall part 611 mounted to the connecting module 52 of the pressing unit 5, and a lower wall part 612 connected to the upper wall part 611. The lower wall part 612 has a through hole 613 having a diameter which is smaller than that of the track ball 62. The track ball 62 has a bottom portion extending downwardly out of the through hole 613. A bottom end of the rod member 525 is securely connected to upper wall part 611.

Referring back to FIGS. 1, 3 and 6, the control unit 7 is electrically connected to the driving module 31 of the driving unit 3 and the Hall-effect sensors of the detecting unit 6, and is disposed for controlling a moving speed of the needle bar 32 corresponding to the rotational speed of the trackball 62.

The control unit 7 stores two preset rolling speed intervals of the track ball 62 which are different from each other, and two needle speed parameters of the needle bar 32 which respectively correspond to the preset rolling speed intervals. It should be noted that, in this embodiment, the number of the preset rolling speed intervals and the number of the needle speed parameters are two, and may be varied in other embodiments.

Figure 7:
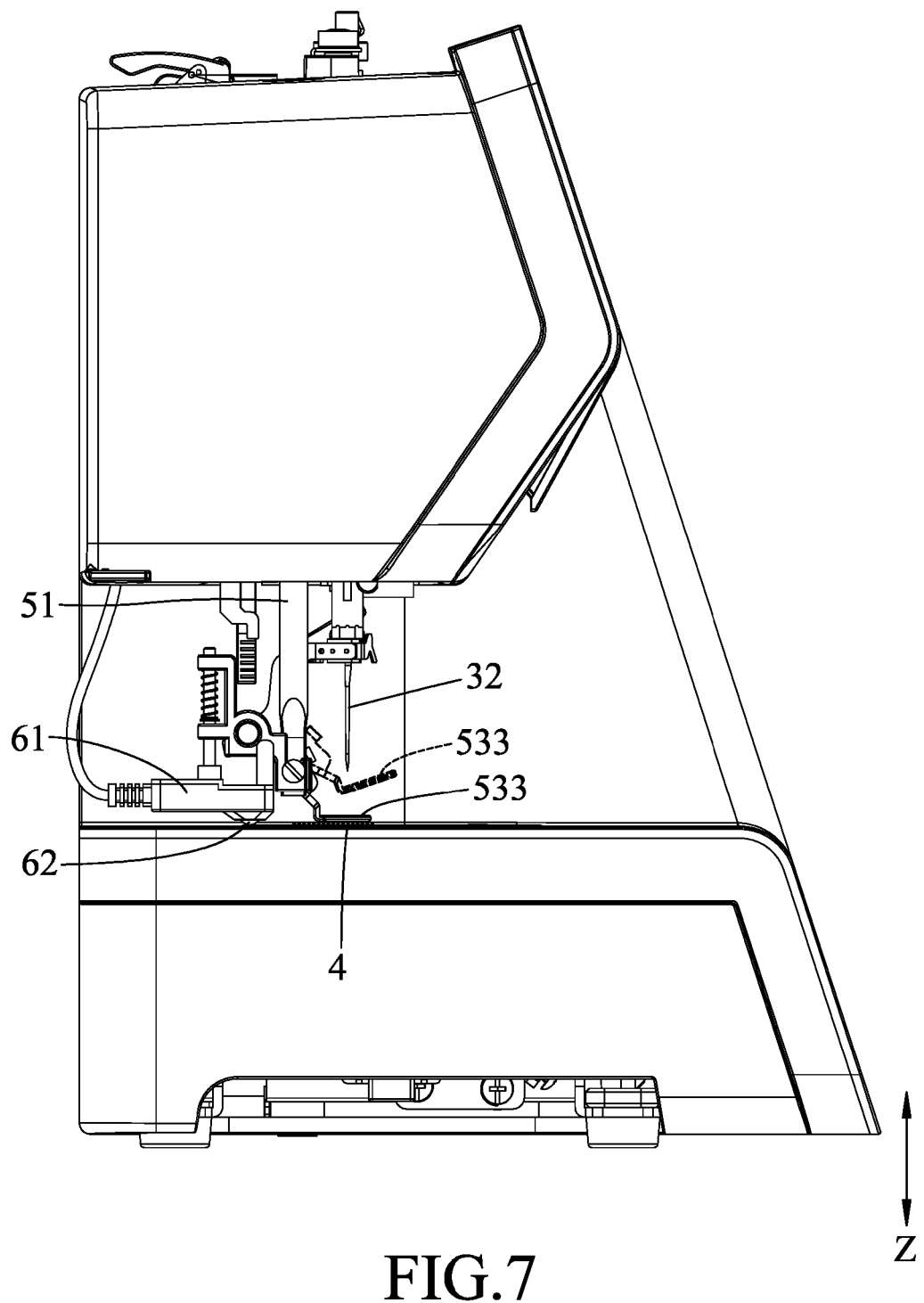
FIG. 7 is a view similar to FIG. 1 but illustrating that a pressing member moves between a pressing position and a non-pressing position.

Referring to FIGS. 1,5 and 7, during operation, the fabric is placed onto the throat plate 4, the pressing member 51 is then operated to move downwardly until the track ball 62 comes into contact with the fabric. Subsequently, the operating portion 532 is operated to move the pressing portion 533 from the non-pressing position (as indicated by the broken lines in FIG. 7) to the pressing position to abut against the fabric.

Figure 8:
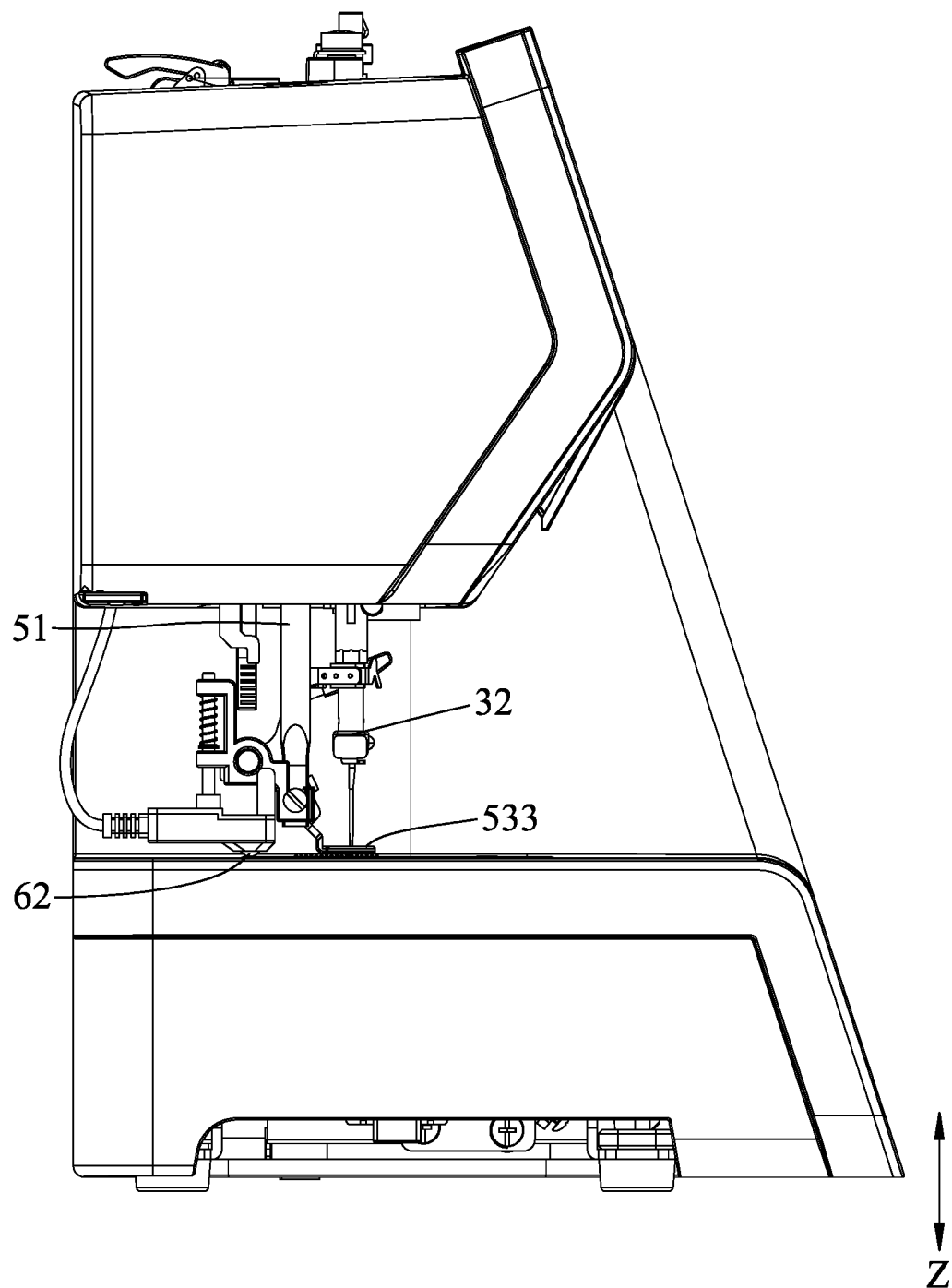
FIG. 8 is a view similar to FIG. 7 but illustrating that the pressing member is at the pressing position.

Referring to FIGS. 3, 6 and 8, when the fabric is moved on the throat plate 4, the track ball 62 rotates relative to the fabric and the housing 61, so that the rotational speed of the track ball 63 is detected by the Hall-effect sensors 63. The control unit 7 receives a signal from the Hall-effect sensors 63 representing one of the preset rolling speed intervals, which corresponds to a rolling speed of each of the magnetic rollers 64 when the track ball is rotated at a time, so as to control the driving module 31 to drive the needle bar 32 to move at a speed which is based on one of the needle speed parameters corresponding to the one of the preset rolling speed intervals.

For example, in this embodiment, the two preset rolling speed intervals respectively represent a high rolling speed interval and a low rolling speed interval, and the two needle speed parameters respectively represent a high needle speed parameter and a low needle speed parameter. When the track ball 62 rotates at a high rotational speed, the high rolling speed interval corresponds to the high needle speed parameter, so that the needle bar 32 is driven to move fast. When the track ball 62 rotates at a low rotational speed, the low rolling speed interval corresponds to the low needle speed parameter, so that the needle bar 32 is driven to move slowly.

In addition, when the rotational speed of the track ball 62 is zero, the control unit 7 drives the driving module 31 to stop movement of the needle bar 32.

In conclusion, with the disposition of the detecting unit 6 and the control unit 7, the needle speed of the needle bar 32 can be automatically adjusted.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A sewing machine comprising:
    a machine seat unit including a bottom seat, and a top seat that is spaced apart from said bottom seat, and that is disposed above said bottom seat;
    a driving unit including a driving module that is mounted to said top seat of said machine seat unit, and a needle bar that is driven by said driving module to move in an upper-lower direction;
    a throat plate mounted to said bottom seat of said machine seat unit, and disposed for engagement with said needle bar;
    a pressing unit including a pressing member that is mounted to said top seat of said machine seat unit, that extends toward said bottom seat of said machine seat unit, and that is movable in the upper-lower direction, and a connecting module that is mounted to said pressing member, and that is driven by said pressing member to move relative to said bottom seat of said machine seat unit;
    a detecting unit including a housing that is mounted to said connecting module of said pressing unit, a track ball that is rotatably disposed on said housing, and that is adapted for contact with a fabric placed on said throat plate, a plurality of magnetic elements, and a plurality of Hall-effect sensors that are disposed in said housing, said track ball being rotated relative to said housing by the fabric when the fabric is moved on said throat plate, said magnetic elements being driven by rotation of said track ball, and disposed for said Hall-effect sensors to detect the rotational speed of said track ball by magnetic field variations; and
    a control unit electrically connected to said driving module of said driving unit and said Hall-effect sensors of said detecting unit, and disposed for adjusting a moving speed of said needle bar based upon the rotational speed of said track ball.

2. The sewing machine as claimed in claim 1, wherein each of said magnetic elements is configured as a magnetic roller.

3. The sewing machine as claimed in claim 2, wherein:
said control unit stores two preset rolling speed intervals of said track ball which are different from each other, and two needle speed parameters of said needle bar which respectively correspond to the preset rolling speed intervals; and
said control unit receives a signal from said Hall-effect sensors when said track ball is rotated at a rotational speed within either one of the preset rolling speed intervals and controls said driving module to drive said needle bar to move based upon one of the needle speed parameters corresponding to the one of the preset rolling speed intervals.

4. The sewing machine as claimed in claim 3, wherein when the rotational speed of said track ball is zero, said control unit drives said driving module to stop movement of said needle bar.

5. The sewing machine as claimed in claim 3, wherein said connecting module of said pressing unit has a fixed member securely mounted to said pressing member, a rod member movable on said fixed member in the upper-lower direction, and having a bottom portion that is securely connected to said housing, and a resilient member disposed between said rod member and said fixed member for providing a resilient force to bias said rod member downwardly to maintain contact between said track ball and the fabric.

6. The sewing machine as claimed in claim 5, wherein said housing of said detecting unit has an upper wall part mounted to said connecting module of said pressing unit, and a lower wall part connected to said upper wall part, said lower wall part having a through hole that has a diameter which is smaller than that of said track ball, said track ball having a bottom portion that extends downwardly out of said through hole.

7. The sewing machine as claimed in claim 6, wherein:
said fixed member has a fixed portion securely connected to said pressing member and said upper wall part of said detecting unit, an upper plate portion and a lower plate portion, said upper and lower plate portions being securely connected to said fixed portion, and being spaced apart from each other in the upper-lower direction;
said rod member has a rod portion movably extending through said upper and lower plate portions, and securely connected to said upper wall part of said housing, and an abutting portion securely connected to said rod portion, and disposed between said upper and lower plate portions; and
said resilient member is configured as a coiled compression spring, and has two ends respectively abutting against said upper plate portion of said fixed member and said abutting portion of said rod member such that, the resilient force provided by said resilient member moves said abutting portion of said rod member toward said lower plate portion of said fixed member.

8. The sewing machine as claimed in claim 6, wherein said pressing unit further includes a presser foot mounted to said fixed member, and disposed for engagement with said needle bar and adapted for pressing the fabric against said throat plate.

9. The sewing machine as claimed in claim 8, wherein said presser foot has a pivot portion pivotally connected to said fixed member, an operating portion securely connected to said pivot portion for manual operation, and a pressing portion securely connected to said pivot portion, said operating portion being operable to move said pressing portion between a pressing position, where said pressing portion is aligned vertically with said throat plate, and a non-pressing position, where said pressing portion is misaligned vertically from said throat plate.

* * * * *